(12) United States Patent
Ramanathan

(10) Patent No.: US 9,601,083 B2
(45) Date of Patent: Mar. 21, 2017

(54) GLARE REDUCTION SYSTEM

(71) Applicant: Venkataraman Ramanathan, Chennai (IN)

(72) Inventor: Venkataraman Ramanathan, Chennai (IN)

( * ) Notice: Subject to any disclaimer, the term of this patent is extended or adjusted under 35 U.S.C. 154(b) by 221 days.

(21) Appl. No.: 13/890,774

(22) Filed: May 9, 2013

(65) Prior Publication Data
US 2014/0267203 A1    Sep. 18, 2014

(30) Foreign Application Priority Data

Mar. 18, 2013  (IN) ............................ 1151/CHE/2013

(51) Int. Cl.
*G09G 3/20*     (2006.01)
*G09G 5/10*     (2006.01)
*G02F 1/1347*   (2006.01)
*G02F 1/1335*   (2006.01)

(52) U.S. Cl.
CPC ............. *G09G 5/10* (2013.01); *G02F 1/1347* (2013.01); *G02F 2001/133531* (2013.01)

(58) Field of Classification Search
CPC ............. B60R 1/12; B60R 2001/1215; B60R 2001/1253; G02B 5/08
See application file for complete search history.

(56) References Cited

U.S. PATENT DOCUMENTS 4,364,039 A * 12/1982 Penz ..................... G02F 1/1347
                                                    345/4
4,443,057 A    4/1984  Bauer et al.
4,927,240 A * 5/1990  Stolov .................... G02F 1/1347
                                                    349/81
4,952,029 A    8/1990  Hayashi et al.
5,044,732 A * 9/1991  Kimura ............... G02F 1/13471
                                                    349/180
5,067,795 A   11/1991  Senatore
6,144,359 A * 11/2000 Grave .......................... 345/102
(Continued)

FOREIGN PATENT DOCUMENTS

| EP | 237163  | 9/1987  |
| EP | 2106971 | 10/2009 |
| EP | 2378350 | 10/2011 |

OTHER PUBLICATIONS

King-Wai Yau, "Phototransduction Mechanism in Retinal Rods and Cones," The Friendwald Lecture, Investigative Ophthalmology & Visual Science, Jan. 1994, vol. 35, No. 1, 24 pages.
(Continued)

*Primary Examiner* — Amare Mengistu
*Assistant Examiner* — Crystal A Mathews
(74) *Attorney, Agent, or Firm* — Klarquist Sparkman, LLP

(57) ABSTRACT

A glare reduction system is provided for glare reduction. The glare reduction system includes an imaging source configured to receive light from an object, and a display driver configured to process the received light to generate an input signal. The glare reduction system further includes a display device configured to receive the input signal. A glare reduction panel is positioned anteriorly to the display device. The glare reduction panel including a liquid crystal layer configured to receive the input signal and an end polarizer with an axis of transmission relative to an angle of transmission of a second polarizer of the display device.

15 Claims, 6 Drawing Sheets

(56) References Cited

U.S. PATENT DOCUMENTS

| | | | |
|---|---|---|---|
| 6,247,820 B1 | 6/2001 | Van Order | |
| 6,690,268 B2 | 2/2004 | Schofield et al. | |
| 6,710,831 B1* | 3/2004 | Winker et al. | 349/115 |
| 7,564,517 B2 | 7/2009 | Daiku et al. | |
| 7,580,085 B2* | 8/2009 | Jacobs et al. | 349/15 |
| 7,656,586 B2 | 2/2010 | Rosario et al. | |
| 8,022,924 B2 | 9/2011 | Weng | |
| 8,432,340 B2 | 4/2013 | Okita | |
| 8,610,846 B2 | 12/2013 | Ishitani | |
| 8,670,091 B2 | 3/2014 | Egi | |
| 9,448,449 B2 | 9/2016 | Ramanathan | |
| 2006/0055713 A1 | 3/2006 | Asao et al. | |
| 2006/0140502 A1 | 6/2006 | Tseng et al. | |
| 2006/0171704 A1* | 8/2006 | Bingle et al. | 396/419 |
| 2007/0126687 A1 | 6/2007 | Choi | |
| 2009/0091634 A1 | 4/2009 | Kennedy et al. | |
| 2009/0096937 A1* | 4/2009 | Bauer et al. | 348/739 |
| 2009/0147186 A1* | 6/2009 | Nakai | G02F 1/13471 349/74 |
| 2009/0174847 A1* | 7/2009 | Kuno | 349/96 |
| 2009/0204207 A1* | 8/2009 | Blum | A61F 2/14 623/4.1 |
| 2009/0257122 A1* | 10/2009 | Hara | G02B 5/005 359/507 |
| 2010/0002018 A1* | 1/2010 | Hirata | G09G 5/028 345/690 |
| 2011/0149212 A1* | 6/2011 | Tomita | G02F 1/133533 349/98 |
| 2011/0273659 A1* | 11/2011 | Sobecki | 349/195 |
| 2011/0317002 A1* | 12/2011 | Muresan et al. | 348/115 |
| 2013/0147851 A1* | 6/2013 | Yim et al. | 345/690 |
| 2013/0215103 A1* | 8/2013 | Chiu | H04N 13/0486 345/419 |
| 2013/0236998 A1 | 9/2013 | Jia | |
| 2013/0286177 A1* | 10/2013 | Deleeuw et al. | 348/77 |
| 2013/0300728 A1* | 11/2013 | Reichow | G09G 3/36 345/419 |
| 2013/0338882 A1* | 12/2013 | Baur | 701/48 |
| 2014/0211114 A1 | 7/2014 | Ramanathan | |
| 2014/0253848 A1* | 9/2014 | Wammes | 349/96 |

OTHER PUBLICATIONS

Rumar, "Relative Merits of the U.S. and Ece High-Beam Maximum Intensities and of Two-and-Four-Headlamp Systems," University of Michigan Transportation Research Institute, Nov. 2000, 52 pages.

Mess, Charles Edward Kenneth, "The Fundamentals of Photography and Other Things," Eastman Kodak Company, 1920, 120 pages.

* cited by examiner

GLARE REDUCTION SYSTEM

TECHNICAL FIELD

The present invention relates to a glare reduction system, and more particularly to a glare reduction panel to be used with a display device in a glare reduction system.

BACKGROUND

Almost every passenger-vehicle comes equipped with a rear-view mirror. The driver may often need to look at the rear-side of the vehicle through this mirror, and is an integral part of driving. While driving, many a times the driver gets blinded by the light reflected through these mirrors. The primary line of vision faces the front whereas the bright light from the rear view mirrors hit the eye at peripheral areas. It has been observed that glancing into the rear view mirrors while such lights are being reflected, causes hyper-polarization and hence straight line driving gets obstructed. Such harsh stimuli caused by the lights reflected from the rear-view mirror results in irritation and lack of response of the eye.

Various technologies have been used to control light from rear-view mirrors, that is, the Left, Centre, or Right mirrors, with varying degrees of success. The systems and methods known in the art approach this problem by using photosensitive materials, such as, electro-chromic glass, using chemical means to achieve dimming of bright lights passed through. Such system averages the light intensity on the entire viewing surface, and therefore results in poor detail in the shadows.

Recently, back-up or parking assist displays have been adopted that provide a video image of a scene of the rear of the vehicle to the driver, where the driver's view may otherwise be obstructed. This is a significant safety feature insofar as it helps to eliminate the chance of driver backing up over an object right behind the vehicle. However, these camera based rear-view mirrors have the limitation that any light hitting the mounted cameras makes the ultra-sensitive averaging CMOS sensor top out, which cause white-blotting in the screens in front of the driver. Hence, their use is restricted only to reversing applications, where wide-mode cameras are used and light controlled by 'not looking', or 'waiting for the offending vehicle to move', to avoid glare.

EP Patent Number 2378350 provides a rearview assembly for a vehicle that includes a housing, a video display positioned in the housing for generating a polarized display image, and a depolarizing device positioned in front of the video display for depolarizing the polarized display image. The intensity of display may be controlled using a glare sensor configured to sense light levels falling on display which may be excessive relative to the prevailing ambient light condition. The intensity of display may be increased from the otherwise normal level when these conditions are present to prevent washout.

In such back-up assist display, the mirror acts in one of two modes: a normal mode and a glare reduction mode; and transitions between one mode and another mode based on the signal from the glare sensor. Such assembly employs a processor system that produces 'enhanced glare free' image. The digital processing required to achieve that in the processor system may be very high, and therefore may increase the overall cost of the assembly. Further, such mirrors offer two different perspectives depending on the eye (Left or Right) and any 'opacity blocking' attempted will create huge hindrance for the other eye, especially since the area of the mirror is small.

Therefore, there is a need of a device which may help to reduce glare without loss of any details. Specifically, there is a need of a system that enables to spatially and selectively process the incoming light for reducing glare, and thus provide better control over the visibility over the viewing surface.

SUMMARY

In one aspect, the present disclosure provides a glare reduction panel adapted to be used with a display device that is configured to receive an input signal. The glare reduction panel includes a liquid crystal layer configured to receive the input signal. The glare reduction panel further includes an end polarizer with an axis of transmission relative to an angle of transmission of a second polarizer of the display device.

In another aspect, the present disclosure provides a glare reduction system configured to provide glare reduction of an image. The glare reduction system includes an imaging source configured to receive light from an object, and a display driver configured to process the received light to generate an input signal. The glare reduction system further includes a display device configured to receive the input signal. A glare reduction panel is positioned anteriorly to the display device. The glare reduction panel including a liquid crystal layer configured to receive the input signal and an end polarizer with an axis of transmission relative to an angle of transmission of a second polarizer of the display device.

In yet another aspect, the present disclosure provides method of glare reduction using a display apparatus having a display device and a glare reduction panel. The method includes generating an input signal corresponding to an object. The method further includes receiving the input signal in the display device to generate a transient image. The method further includes receiving the input signal in the glare reduction panel, positioned anteriorly to the display device, to manipulate the transient image to provide an end image.

DETAILED DESCRIPTION

Figure 1:
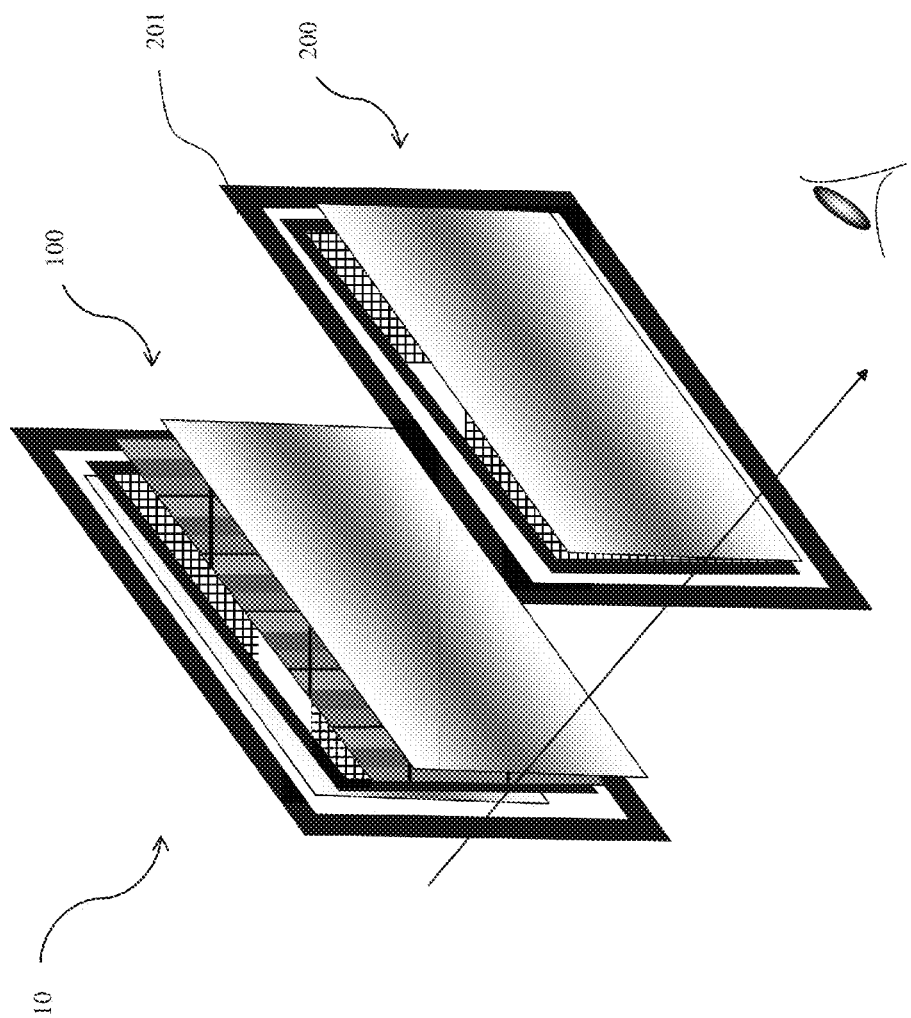
FIG. 1 illustrates an exploded schematic view of a display apparatus, in accordance with an embodiment of the present disclosure.

The present invention has been described in detail with reference to the accompanying figures. FIG. 1 illustrates a display apparatus 10 in accordance with an embodiment of the present disclosure. The display apparatus 10 of the present disclosure includes a traditional Liquid Crystal based display device, herein after referred to as display device 100. The display device includes any one of a liquid crystal display (LCD), thin film transistor liquid crystal display (TFT LCD), light-emitting diode display (LED), organic light-emitting diode display (OLED), or the like.

Figure 2:
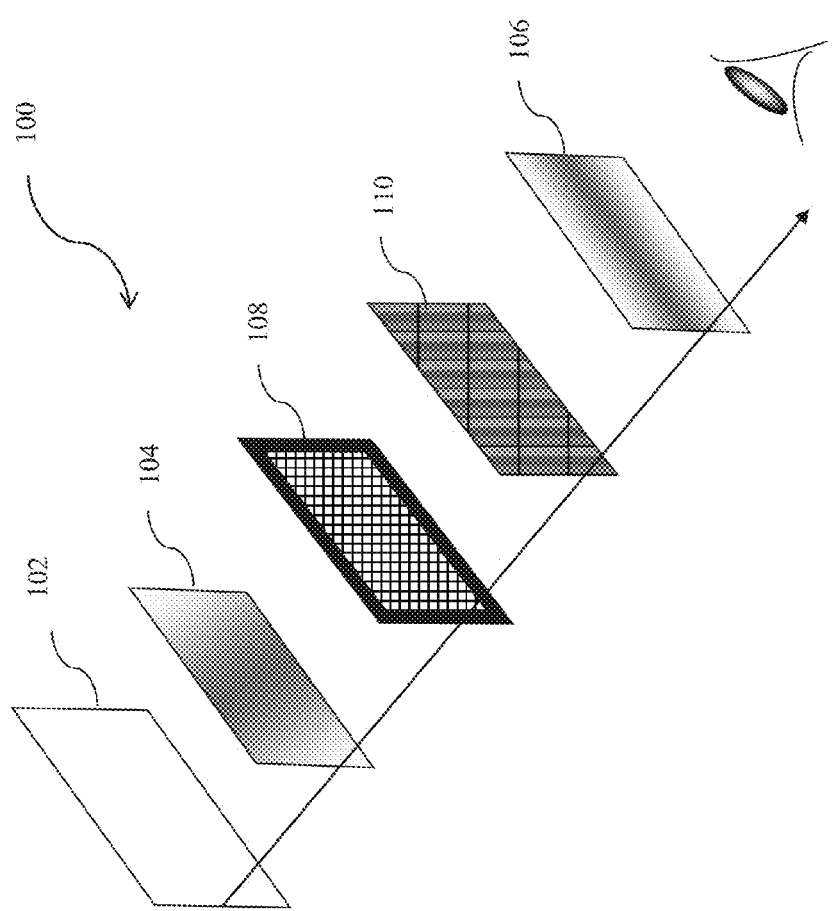
FIG. 2 illustrates an exploded schematic view of traditional liquid crystal display device.

FIG. 2 illustrates a detailed embodiment of the display device 100. Typically, the display device 100 includes a back panel and a front transparent sheet between which the various components are sandwiched. Further, as illustrated, a rear light panel or a light source 102 is disposed to provide light for the display device 100. FIG. 2 also shows an arrow indicating the direction of light flow from the rear light panel 102 to the eye. In an embodiment, the display device 100 includes a first polarizer 104 and a second polarizer 106 with axis of transmission perpendicular to each other. Further, the display device 100 includes a liquid crystal layer 108 having a conductive layer of electrodes, to selectively and variably apply potential difference to each area of crystal. The crystal has a uniform rotation of light without the application of the voltage, that is, in an unexcited state. In an excited state, the crystal elements rotate light from the first polarizer 104 to the second polarizer 106 uniformly at an angle dependent on the input signal voltage. A color filter 110 is also included with a polymer pigmentation layer that overlays RGB (Red, Green and Blue) pigments on top of the liquid crystal layer 108.

Depending on the voltage applied, the crystal rotates the polarization angle of light in various degrees from 0 to 90 degrees. The light from the light source 102 passes through the first polarizer 104, re-orients by the liquid crystal layer 108, flows through the color filter 110 picking up a hue and hits the second polarizer 106 in various angles between being fully-perpendicular to being fully-aligned. The brightness of that sub-pixel when looked straight upon, is determined by I×cos(θ), where I is the original intensity of light, and θ is the angle between the polarized light from the liquid crystal layer 108 and the second polarizer 106, thus allowing controllability of intensity of each sub-pixel or picture element.

According to an embodiment, the display apparatus 10 further includes a glare reduction panel 200. Referring back to FIG. 1, the glare reduction panel 200 is illustrated in relation to the display device 100, in the display apparatus 10. The glare reduction panel 200 together with the display device 100 forms the display apparatus 10. The glare reduction panel 200 may include a frame 201 to support the various components therein. The frame 201 is basically an adjustable mounting bracket that provides space for mounting the various components of the glare reduction panel 200. In the display apparatus 10 of the present disclosure, the glare reduction panel 200 is disposed anteriorly to the display device 100 in respect to the viewer. That is, the glare reduction panel 200 is fixed over top of the display device 100.

In an embodiment, the glare reduction panel 200 may be integrally manufactured with the display device 100. Alternatively, the glare reduction panel 200 may be a standalone unit and include provisions, such as, a clip or the like, which allows the panel 200 to be retro-fitted or fixed on top of the display device 100 at a later stage. In an embodiment, the glare reduction panel 200 may be fixed over the display device 100 by means of optical glue or the like, readily available in the market.

Figure 3:
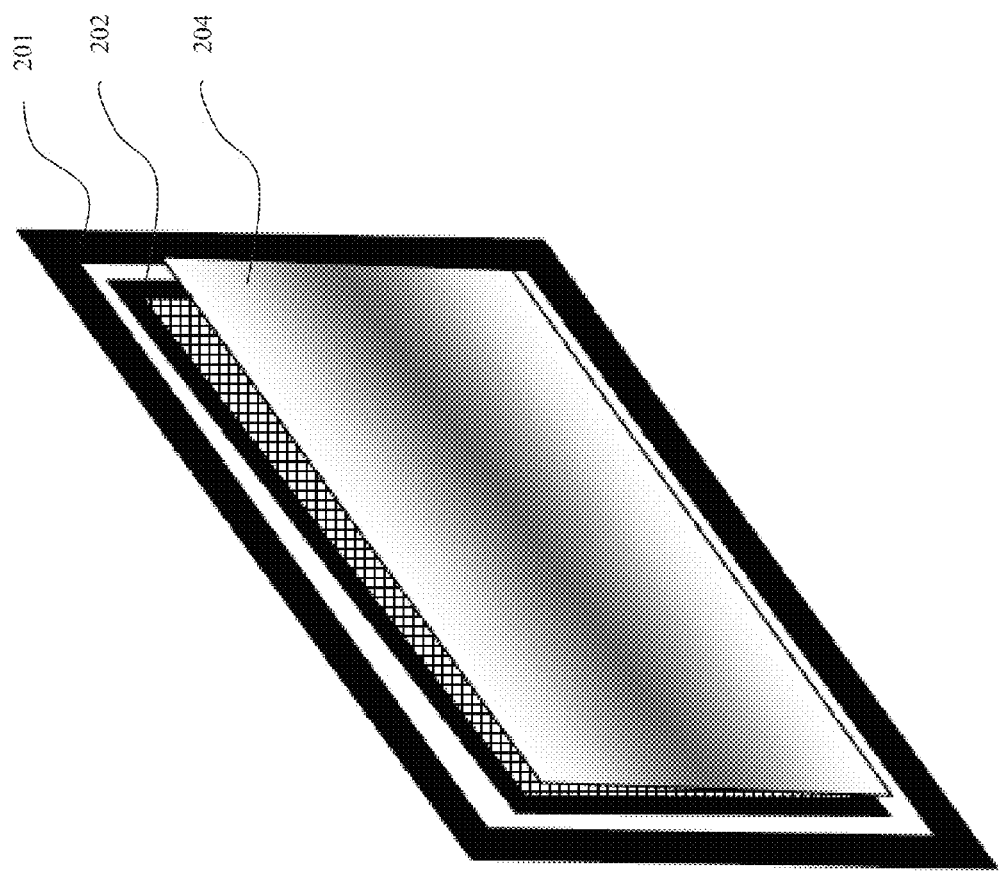
FIG. 3 illustrates an exploded schematic view of a glare reduction panel, in accordance with an embodiment of the present disclosure.

FIG. 3 illustrates a detailed embodiment of the glare reduction panel 200. The glare reduction panel 200 of the present disclosure essentially includes a liquid crystal layer 202, and an end polarizer 204. The liquid crystal layer 202, like the liquid crystal layer 104 of the display device 100, includes a conductive layer of electrodes, to selectively and variably apply potential difference to each area of crystal. Depending on the voltage applied, the crystal rotates the polarized image received from the display device 100. Further, the end polarizer 204 is provided with a pre-defined angle of transmission relative to the second polarizer 106 of the display device 100. That way, the glare reduction panel 200 may be able to regulate the intensity of the light received from the display device 100. In a particular embodiment, the end polarizer 204 has an angle of transmission perpendicular to the second polarizer 106.

It may be contemplated by a person ordinarily skilled in the art that the glare reduction panel is fundamentally a display device without the rear light source, first polarizer and the color filter. Further, it may be understood that the resolution of the glare reduction panel 200 may be similar to the display device 100, in the display apparatus 10. Typically, the display apparatus 10 may be available in dimensions of approximately 10.2 inches (diagonal) for the Center rear-view mirror and approximately 7 inches (diagonal) for the Right and Left rear-view mirror. However, the disclosure may not be limited to these dimensions which may vary as per the application needs and requirements.

Figure 4:
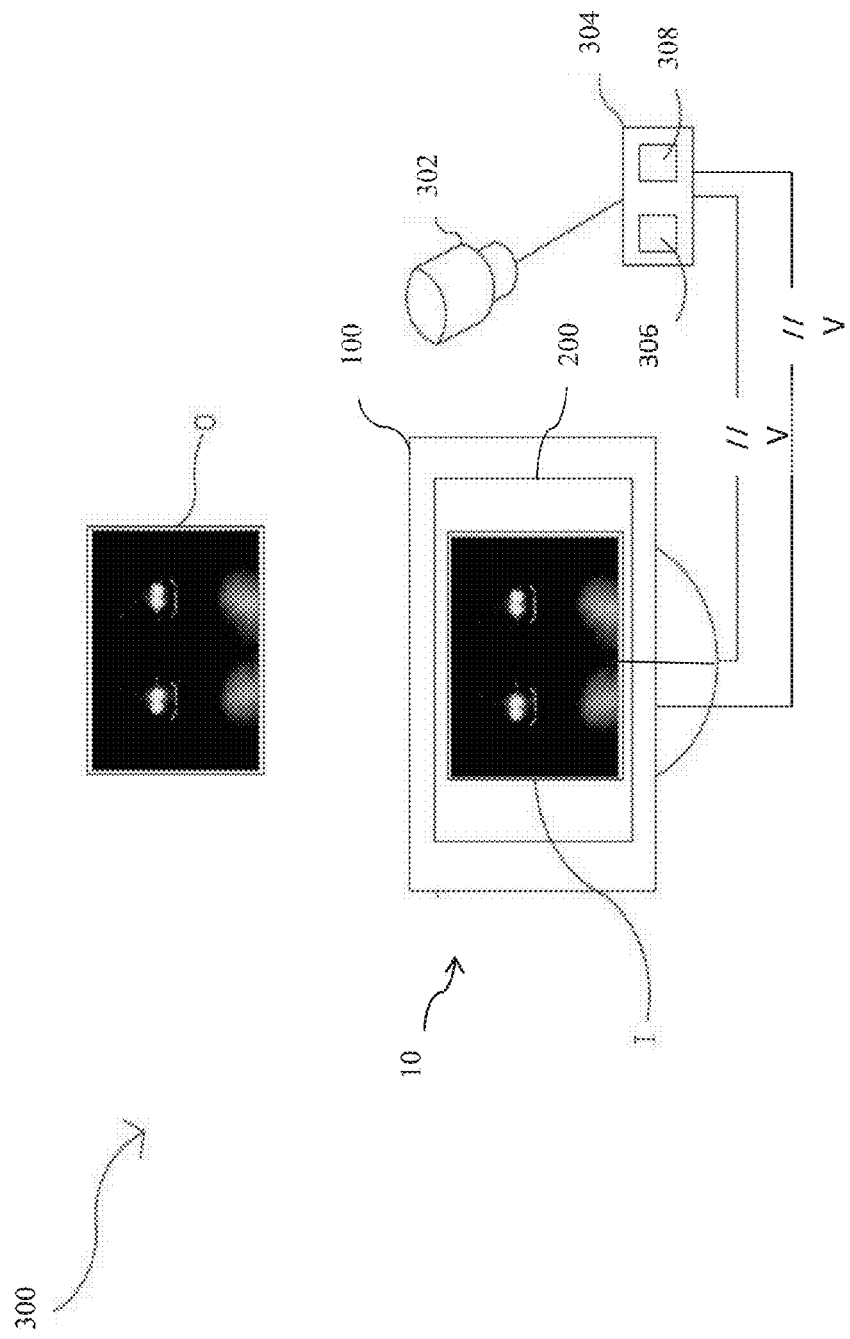
FIG. 4 illustrates a schematic view of a glare reduction system, in accordance with an embodiment of the present disclosure.

Moving on, FIG. 4 illustrates a glare reduction system 300 in accordance with an embodiment of the present disclosure. The glare reduction system 300 incorporates the display apparatus 10 of the present disclosure. In addition, the glare reduction system 300 includes an imaging source 302 and a display driver 304. The imaging source 302 may be a fixed-focus camera conventionally known in the art. The imaging source 302 may be configured to receive light from an object O. The display driver 304 may be configured to process the light received by the imaging source 302 and convert it to be used with the display apparatus 10.

The display driver 304 includes a CMOS sensor 306 configured to convert the received light from the imaging source 302 into an image signal. In an embodiment, the CMOS sensor 306 may further be configured to define a threshold value, based on the different applications of the system. This way, the CMOS sensor 306 may allow providing the image signal only for the light intensity values below the defined threshold. Typically, the threshold cut-off is achieved by using the ISO setting which affects sensitivity of the CMOS sensor 306. The display driver 306 further includes an analog video controller 308. The analog video controller 308 may be configured to process the image signal received from the CMOS sensor 306, and convert the image signal into an input signal V for the display apparatus 10. In an embodiment, the analog video controller 308 of the present disclosure is an NTSC controller.

In an embodiment, the display driver 304 is integrated with the display apparatus 10. Otherwise, as is typically known in the art, the CMOS sensor 306 is already provided in the conventional imaging source 302, and the analog video controller 308 is provided in the conventional display device 100.

According to an embodiment, the analog video controller 308 of the present disclosure is configured to split-feed the input signal to the display device 100 and the glare reduction panel 200, of the display apparatus 10. It may be contemplated by a person ordinarily skilled in the art that in case of the glare reduction panel 200 being available as a separate unit to be fixed to the display device 100, the analog video controller of the display device 100 may include provisions to provide an analogous input signal V, as fed to the display device 100, for the glare reduction panel 200 fixed thereon. In an embodiment, the analog video controller 308 may also be configured to calibrate the image signal to adjust color saturation, contrast and brightness of the display apparatus 10. In particular, the analog video controller 308 may be configured to control the contrast setting, and therefore affect the darkness or brightness of the end image I generated by the display apparatus 10.

As discussed above, the display driver 304 is configured to deliver the processed input signal V to the display device 100 and the glare reduction panel 200, of the display apparatus 10. Specifically, the display driver 304 provides the analogous input signals V to the liquid crystal layers 108, 202 of the display device 100 and the glare reduction panel 200. The input signal V excites the specific liquid crystals which orients in response to alter the opacity of the corresponding picture element. In the display apparatus 10, having the above-described construction, the end image I to be displayed is established by generating a transient image at the display device 100 and further manipulated by the glare reduction panel 200.

Thus, the light from the light source 102, of the display device 100, is manipulated by means of the liquid crystal layer 108, and the first and second polarizer 106, 108 to generate a transient light signal or a transient image T based on the voltage signal V. Subsequently, the transient image T is passed through the glare reduction panel 200. In the glare reduction panel 200, the transient image T is re-oriented by the liquid crystal layer 202 and further received at the end polarizer 204 in various angles between being fully-perpendicular to being fully-aligned. Thus the transient image T from the display device 100 is manipulated to generate the end image I. The intensity of the resultant end image I when looked straight upon, is determined by $I \times \cos(\theta)$, where I is the original intensity of transient image T, and $\theta$ is the angle between the light from the liquid crystal layer 202 and the end polarizer 204.

INDUSTRIAL APPLICABILITY

The display apparatus 10 of the present disclosure is configured for glare reduction of the image received in the imaging source 302. The glare reduction method includes generating an input signal V corresponding to an object O in front of the imaging source 302. Further, the method includes receiving the input signal in the display device 100 to generate the transient image T. As conventionally known in the art, generating the transient image T includes manipulating the light from the light source 102 in the display device 100 passed via the first polarizer 104, re-oriented by the liquid crystal layer 108 based on the input signal V, and subsequently through the second polarizer 106.

According to an embodiment of the present disclosure, the method further includes receiving the input signal V in the glare reduction panel 200, positioned anteriorly to the display device 100. Based on the input signal V, the glare reduction panel 200 manipulates the transient image T to provide the end image I. Specifically, generating the end image I includes re-orienting the transient image T by the liquid crystal layer 202 based on the input signal V, and passing the re-oriented transient image through the end polarizer 204 with a predefined axis of transmission. According to a particular embodiment, the re-oriented transient image is passed through the end polarizer 204 with the axis of transmission perpendicular to the second polarizer 106 of the display device 100 to generate the end image I.

For the purpose of the present disclosure, the analog video controller 308 may be calibrated to have high contrast settings in order to darken the bright lights received by the imaging source 302, and therefore achieve better glare reduction. It may be understood that the glare reduction panel 200 acts as a traditional display device with the color filter removed, in addition to back panel, light source and first polarizer of the traditional display device, as the presence of color filter may result in "striping" in the end image I, because of the auto-stereoscopic effect.

In consideration for the driving applications, the glare reduction system 300 of the present disclosure may be used as the rear-view mirror for the vehicle. The reason why camera based rear view mirrors are not used to guide drivers even in application such as large commercial vehicles is because any light hitting the cameras makes the ultra-sensitive averaging CMOS sensor top out, which cause white-blotting in the screens in front of the driver. It may be also be understood that for traffic applications, the display device may be required to produce at least a minimum frame rate for the driver's purpose. The existing system using digital processing requires large processing power to achieve glare reduction.

The system of the present disclosure eliminates the effects of flare, while providing a hint of the source of flare. The system enables better perception of objects around bright lights due to extensive contrast reduction, and hence enhances color perception during day/night time driving. The glare reduction system 300 of the present disclosure when used as a rear-view mirror for a vehicle, it is derivable that the brightest of white lights will dim in proportion to their brightness to produce a dull grey light in the display apparatus 10. This may allow to altogether eliminate the rear windshield and therefore offers several advantages such as roof high storage, raised passenger seats, among other things. Since the system of the present disclosure utilizes an analog controller, it may be able to achieve a frame rate of more than 30 Hz which would be sufficient for the purpose.

Further, the system may be used for front view, that is, to replace the whole windshield in a vehicle with the display apparatus 10 of the present disclosure, given a nice high-resolution display device 100 and the glare reduction panel 200, along with the high resolution camera, is employed. In an embodiment, the system 300 may also be used to provide 3-Dimensional view by using two cameras for front-view and/or two cameras for each direction (L, C, R) in case of rear-view mirror; and compose the image by using interlacing controller, provide the same interlaced input for the display device 100 and the glare reduction panel 200, and use a 3D glass with rotation-tunable polarizers.

In yet another embodiment, the glare reduction system 300 could employ an Infrared (IR) camera as the imaging source 302. In a typical IR camera, a hot-mirror filter that is in front of every CMOS sensor is removed. Such system provides an enhanced night-vision image with reduced glare.

Further, the system 300 may be employed in various other applications. For example, the system 300 may be used in fire-fighting operations where raging fire is very bright. The currently operational in which the video feed of the fire affected area is derived by camera, say mounted on a robotic mover, the image produce may be prone to glare which limits the available information and this hinders the rescue operation. The present system 300 may help to reduce such glare, and therefore would be more effective for such operations. Similarly, the system 300 may be used for snow rescue operations, where the light reflected from snow is ultra-bright and affects the eye due to hyper-polarization of majority of the retina, and could also lead to snow-blindness from continued exposure.

Figure 5:
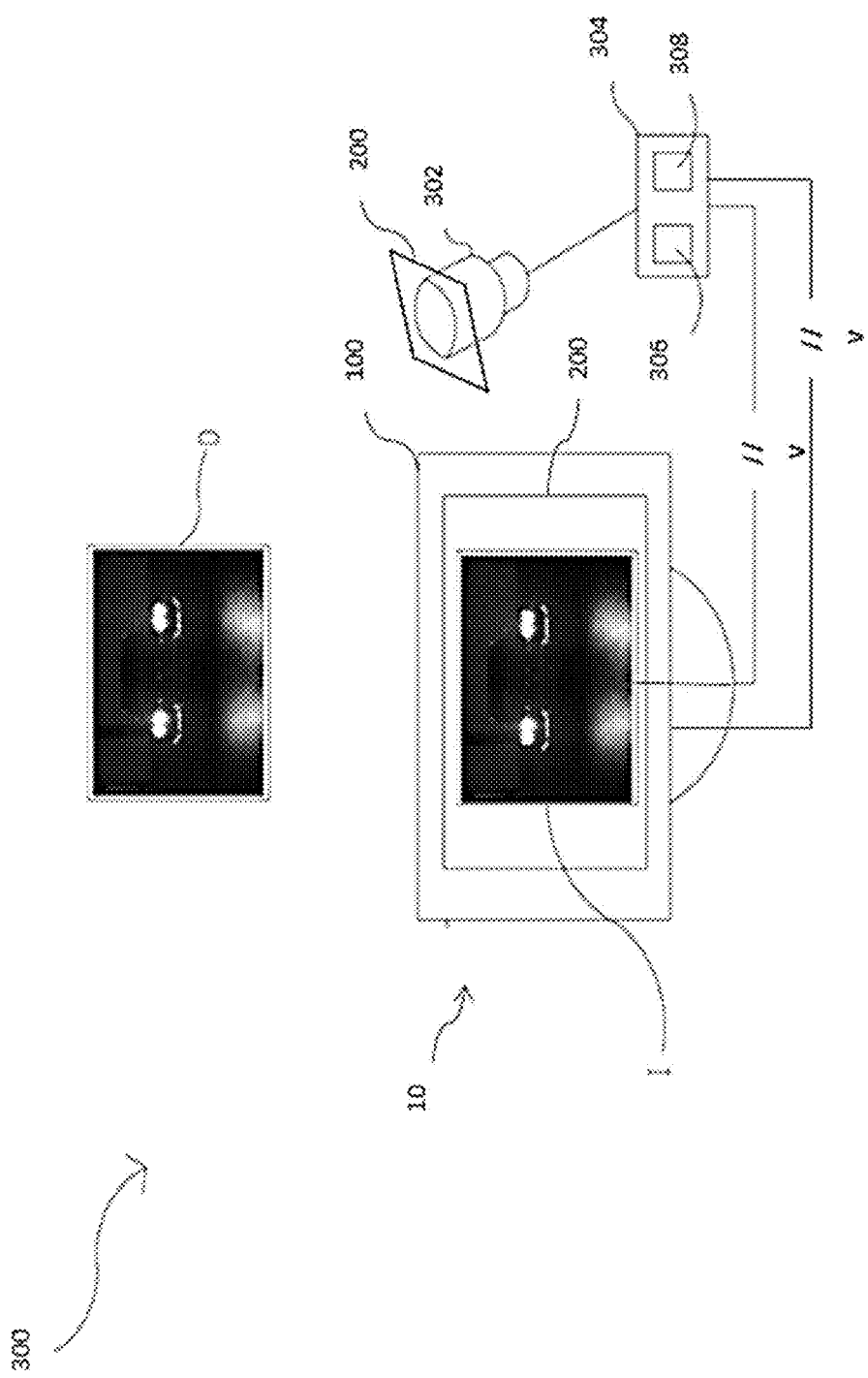
FIG. 5 illustrates a schematic view of a glare reduction system, in accordance with an embodiment of the present disclosure.
Figure 6:
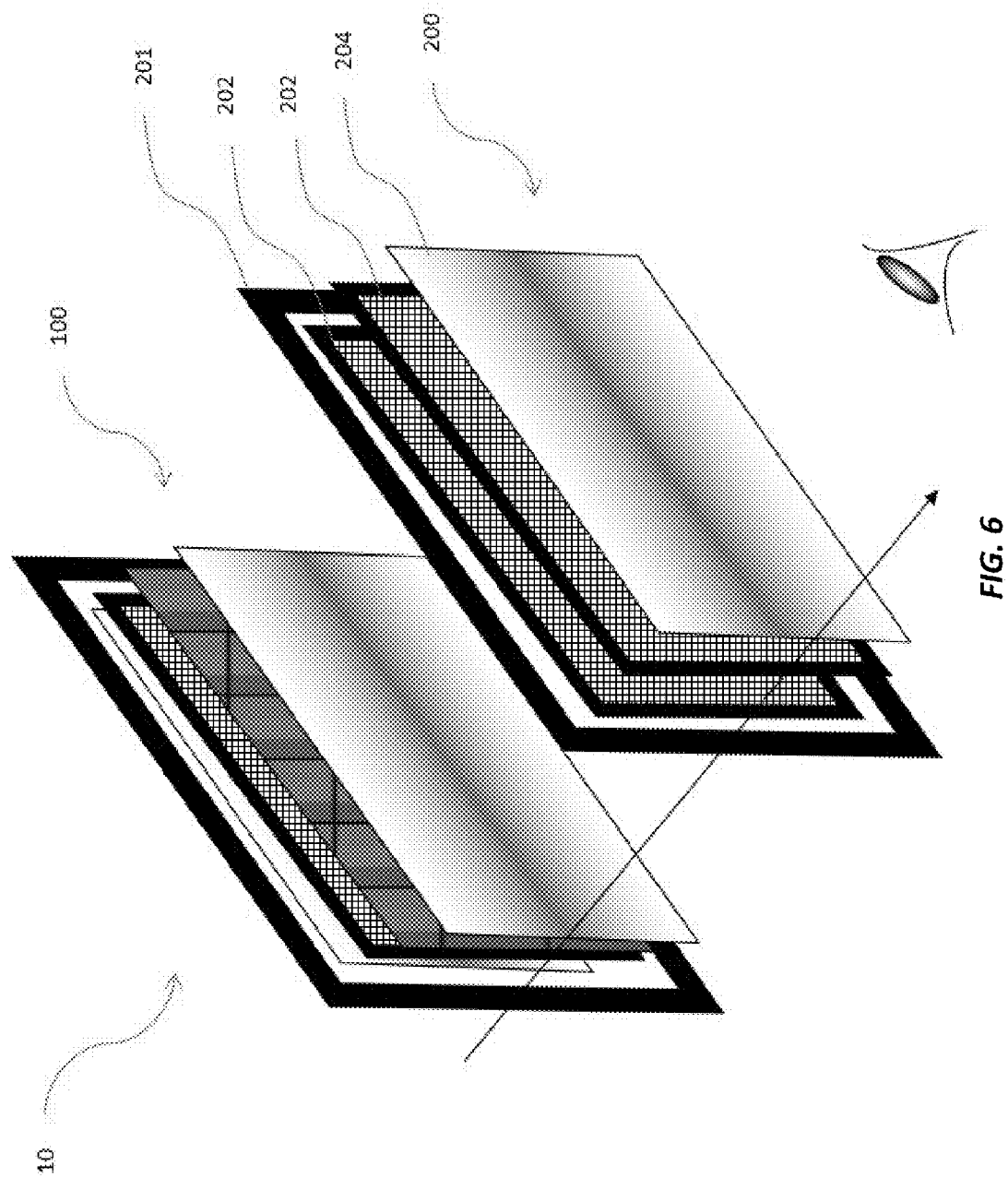
FIG. 6 illustrates an exploded schematic view of a glare reduction system, in accordance with an embodiment of the present disclosure.

According to an embodiment, as shown in FIG. 5, the glare reduction panel 200 may be mounted on top of the imaging source 302 as a layer. Such combination achieves glare reduction at both the imaging source 302 and the display apparatus 10. This allows for the display device 200 to be brightened extensively to increase visibility in shadows for night-time driving/applications by providing enhanced glare reduction, while not hurting driver's eyes due to the sudden glare. In a further embodiment, as shown in FIG. 6, two glare reduction panels 200 may be placed on top of each other with the end polarizer in between removed. It may be understood by a person ordinarily skilled in the art that the composite rotation in such a device resembles I×Cos (2×theta), wherein theta is intensity of the received light on the CMOS sensor 306. Such system may particularly be applicable for fog isolation and contrast improvement. Therefore, the system 300 may be employed for fog commute where highlights and lowlights are lost due to a graying out at a narrow exposure value due to fog.

Although the embodiments of this disclosure as described herein may be incorporated without departing from the scope of the following claims, it will be apparent to those skilled in the art that various modifications and variations can be made. Other embodiments will be apparent from consideration of the specification and practice of the disclosure. It is intended that the specification and examples be considered as exemplary only, with a true scope being indicated by the following claims and their equivalents.

I claim:

1. A glare reduction panel adapted to be used with a liquid crystal based display device that is configured to receive a first input voltage signal so as to generate a light signal associated with the first input voltage signal and to transmit the light signal through a first liquid crystal layer and subsequently through a second polarizer of the liquid crystal based display device, the glare reduction panel including:
a second liquid crystal layer comprising a plurality of liquid crystals, the second liquid crystal layer being configured to receive the light signal from the second polarizer and to receive a second input voltage signal same as the first input voltage signal, so as to excite a set of liquid crystals of the plurality of liquid crystals to adjust a polarization associated with the light signal received by the set of the liquid crystals of the plurality of liquid crystals; and
an end polarizer configured to receive the light signal from the second liquid crystal layer, the end polarizer having an axis of transmission relative to an axis of transmission of the second polarizer of the display device;
wherein the second liquid crystal layer and the end polarizer are situated to opacify the light signal, received by the set of liquid crystals of the plurality of liquid crystals, by continuing a polarization rotation of the light signal as received by the second liquid crystal layer, based on the second input voltage signal so as to rotate the polarization outside of a 0 to 90 degree range associated with the liquid crystal based display device, wherein the first voltage signal and the second voltage signal are generated and applied to the first crystal layer and the second crystal layer by a sensor when an intensity of light incident on the sensor is greater than a threshold value.

2. The glare reduction panel of claim 1, wherein the first liquid crystal layer of the display device is included in any one of a liquid crystal display (LCD), thin film transistor liquid crystal display (TFT LCD), lightemitting diode display (LED), organic light-emitting diode display (OLED).

3. The glare reduction panel of claim 1 adapted to be integrally manufactured with the display device.

4. The glare reduction panel of claim 1 adapted to be retro-fitted to the display device.

5. A glare reduction system, comprising:
an imaging source configured to receive light from an object;
a display driver configured to process the received light to generate an input voltage signal when an intensity of light received from the object is greater than a threshold value;
a display device configured to receive the input voltage signal and to produce an image corresponding to the light received from the object, wherein the display device comprises:
a first liquid crystal layer configured to receive linearly polarized light and to selectively rotate the linear polarization of the light within a range of 0 to 90 degrees based on the input voltage signal and the threshold value,
a second polarizer positioned anteriorly to the first liquid crystal layer, wherein the second polarizer has a predetermined polarization angle with respect to the linear polarization of the light received by the first liquid crystal layer; and
a glare reduction panel positioned anteriorly to the display device so as to receive the image generated by the display device, the glare reduction panel including:
a second liquid crystal layer comprising a plurality of liquid crystals, the second liquid crystal layer being positioned adjacent to the second polarizer such that the second polarizer is interposed between the first liquid crystal layer and the second liquid crystal layer and that is configured to continue the selective polarization rotation of the light of the image, received by a set of liquid crystals of the plurality of liquid crystals, outside the 0 to 90 degree range by selectively exciting the set of liquid crystals of the plurality of liquid crystals based on the input voltage signal, wherein the same input voltage signal applied to the first liquid crystal layer and the second liquid crystal layer; and
an end polarizer having an axis of transmission relative to an axis of transmission of the second polarizer of the display device so as to receive the image from the second liquid crystal layer, wherein the end polarizer opacifies the light received from the set of liquid crystals of the plurality of liquid crystals.

6. The glare reduction system of claim 5, wherein the imaging source includes a video camera.

7. The glare reduction system of claim 5, wherein the display driver includes a CMOS sensor.

8. The glare reduction system of claim 5, wherein the display driver includes an analog video controller.

9. The glare reduction system of claim 5, wherein the display device includes any one of a liquid crystal display (LCD), thin film transistor liquid crystal display (TFT LCD), lightemitting diode display (LED), organic light-emitting diode display (OLED).

10. The glare reduction system of claim 5, wherein the display device includes a light source situated to generate light and a first polarizer situated to linearly polarize the light to be received by the first liquid crystal layer.

11. The glare reduction system of claim 5, wherein the glare reduction panel is integrally manufactured with the display device.

12. The glare reduction system of claim 5, wherein the glare reduction panel is adapted to be retro-fitted to the display device.

13. A method of glare reduction using a display apparatus having a liquid crystal based display device and a glare reduction panel, the method comprising:
  generating an input voltage signal corresponding to an object when an intensity of light received from the object is greater than a threshold value;
  receiving the input voltage signal in the display device;
  selectively rotating a linear polarization of light in the display device in a first direction, within a range of 0 to 90 degrees, in order to generate a transient image corresponding to the input voltage signal that has a glare associated with optical intensities above a level associated with the threshold value;
  receiving the input voltage signal in the glare reduction panel positioned anteriorly to the display device separately from the receiving of the input voltage signal by the display device, wherein the glare reduction panel receives the light corresponding to the transient image from the display device, wherein the glare reduction panel includes a liquid crystal layer comprising a plurality of liquid crystals and is configured to receive the input voltage signal, wherein the glare reduction panel further includes an end polarizer having an axis of transmission relative to an axis of transmission of a second polarizer of the display device; and
  continuing the selective rotation of the linear polarization of the light of the transient image, received by a set of liquid crystals of the plurality of liquid crystals, in the first direction, outside the 0 to 90 degree range, by selectively exciting a set of liquid crystals of the plurality of liquid crystals based on the input voltage signal and threshold value in order to opacify the light received by the set of liquid crystals of the plurality of liquid crystals and to produce an end image having a glare reduced in relation to the transient image.

14. The method of claim 13, wherein the light that is selectively rotated in the display device is received by the display device before the selective rotation from a light source and the light is passed through a first polarizer to provide the light with the linear polarization state that is selectively rotated, and the light is further passed through a second polarizer after the selective rotation to generate the transient image in the display device.

15. The method of claim 14, wherein the continuing the selective rotation of the linear polarization of the light further includes directing the light with the continued polarization rotation to the end polarizer of the glare reduction panel to generate the end image.

* * * * *